(12) United States Patent
Schieke

(10) Patent No.: US 9,827,627 B2
(45) Date of Patent: Nov. 28, 2017

(54) METHOD FOR MODIFYING THE FLANKS OF A GEAR WHEEL TOOTH WITH THE AID OF A TOOL

(71) Applicant: Prawema Antriebstechnik GmbH, Eschwege/Werra (DE)

(72) Inventor: Jörg Schieke, Erfurt-Marbach (DE)

(73) Assignee: Präwema Antriebstechnik GmbH, Eschwege/Werra (DE)

( * ) Notice: Subject to any disclaimer, the term of this patent is extended or adjusted under 35 U.S.C. 154(b) by 0 days.

(21) Appl. No.: 14/428,539

(22) PCT Filed: Sep. 17, 2013

(86) PCT No.: PCT/EP2013/069256
§ 371 (c)(1),
(2) Date: Mar. 16, 2015

(87) PCT Pub. No.: WO2014/041191
PCT Pub. Date: Mar. 20, 2014

(65) Prior Publication Data
US 2015/0217389 A1 Aug. 6, 2015

(30) Foreign Application Priority Data
Sep. 17, 2012 (DE) .......................... 10 2012 108 717

(51) Int. Cl.
*B23F 23/12* (2006.01)
*B23F 19/00* (2006.01)
*B23F 19/05* (2006.01)

(52) U.S. Cl.
CPC ........ *B23F 23/1231* (2013.01); *B23F 19/002* (2013.01); *B23F 19/057* (2013.01)

(58) Field of Classification Search
CPC ..... B24B 53/075; B24B 53/085; B24B 53/12; B24B 53/083; B24B 53/06; B24B 53/065; B23F 1/02
(Continued)

(56) References Cited

U.S. PATENT DOCUMENTS 5,738,569 A * 4/1998 Mackowsky ............. B23F 5/04
451/324
6,234,880 B1 * 5/2001 Scacchi ............... B23F 23/1225
451/443
(Continued)

FOREIGN PATENT DOCUMENTS

DE        EP 0993908 A2 * 4/2000 .......... B24B 53/075
DE        202007006219 U1    7/2007
(Continued)

Primary Examiner — Monica Carter
Assistant Examiner — Lauren Beronja
(74) Attorney, Agent, or Firm — The Webb Law Firm

(57) ABSTRACT

The invention relates to a method for modifying the geometry of gear wheel tooth flanks with a tool with a toothing that engages with the gear wheel during a precision machining. A varied profile is produced on the tool over the width of the tool, in that during a dressing procedure a dressing wheel is moved along the tooth flank of the tooth to be dressed. The width of the teeth of the dressing wheel is much smaller than the width of the tool. In order to cover the width of the tool a length must be covered corresponding to a multiple of the width of the teeth of the dressing wheel. After the dressing, the precision machining of the gear wheel is carried out with the tool. Since the dressing wheel is moved with a changing pitch and a changing crossed axes angle relative to the tool, the modification of the tooth flank geometry can be reproduced in the tool. A modification of the crossed axes angle dependent on the helical angle of the
(Continued)

tool takes place with equalization of the helical angle of the tool changing over the width of the teeth of the tool.

10 Claims, 5 Drawing Sheets

(58) Field of Classification Search
USPC .................................. 451/47, 11, 177, 443
See application file for complete search history.

(56) References Cited

U.S. PATENT DOCUMENTS

| | | | |
|---|---|---|---|
| 6,497,610 B1 | 12/2002 | Reichert | |
| 6,958,000 B2 * | 10/2005 | Yoshioka | ............ B23F 23/1281 |
| | | | 409/55 |
| 2007/0202774 A1 * | 8/2007 | Yanase | ................ B23F 23/1225 |
| | | | 451/5 |
| 2008/0268756 A1 | 10/2008 | Schenk | |

FOREIGN PATENT DOCUMENTS

| | | | | |
|---|---|---|---|---|
| DE | 102007043384 A1 | | 3/2009 | |
| DE | 102007043402 A1 * | | 3/2009 | .......... B23F 23/1225 |
| DE | 102010024366 A1 | | 12/2011 | |
| EP | 0993908 A2 | | 4/2000 | |
| EP | 1084786 A1 * | | 3/2001 | .......... B23F 23/1231 |
| EP | 2036674 A2 | | 3/2009 | |

* cited by examiner

METHOD FOR MODIFYING THE FLANKS OF A GEAR WHEEL TOOTH WITH THE AID OF A TOOL

CROSS-REFERENCE TO RELATED APPLICATIONS

This application is the United States national phase of International Application No. PCT/EP2013/069256 filed Sep. 17, 2013, and claims priority to German Patent Application No. 10 2012 108 717.2 filed Sep. 17, 2012, the disclosures of which are hereby incorporated in their entirety by reference.

BACKGROUND OF THE INVENTION

Field of the Invention

The invention relates to a method for modifying the geometry of the tooth flanks of a gear wheel with the aid of a tool that has a toothing that engages with the teeth of the gear wheel during a precision machining.

Description of Related Art

From DE 10 2007 043 402 A1, the contents of which are incorporated in the disclosure of the present application, it is known that corrections to the profile of the gear wheel to be respectively precision machined can be carried out extremely economically and at the same particularly effectively as regards technological aspects if the shape elements required for the respective geometrical alteration are incorporated into the tool used for the precision machining. In this connection the particular feature of this known method consists in that for the dressing, a narrow dressing wheel is used whose width compared to the width of the tooth to be respectively machined is optimally so small that the dressing wheel in the dressing process runs over the tooth flank to be machined simply in a line contact or with a contact zone reduced to a point. Owing to the use of such a narrow dressing wheel the configuration of the tool to be dressed can be shaped simply by a corresponding movement of the dressing wheel, so that in the subsequent precision machining of a gear wheel with such a dressed tool profile corrections can be produced on the machined gear wheel. The shape of the narrow dressing wheel must either agree in all parameters with the workpiece toothing or complicated and costly additional control possibilities must be included in the respective dressing device.

A comparable procedure had been suggested in DE 10 2007 043 384 for the correction of the flank line of a gear wheel.

It is known that the behaviour in use of cylindrical gear toothings can be decisively influenced not only by the macrogeometry achievable with the aforedescribed method, but also by purposefully introduced flank modifications or shape deviations occurring due to process conditions. These shape deviations include the so-called "twists", which involve twisting of the teeth flanks. Twists are as a rule undesirable, but however can also be introduced specifically in order to improve for example the running properties of gear wheels.

Against the background of the aforedescribed prior art the object of the invention consisted in providing a method with which also complicated flank modifications can be economically implemented.

SUMMARY OF THE INVENTION

The method according to the invention for modifying the geometry of the tooth flanks of a gear wheel with the aid of a tool that has a toothing that engages with the teeth of the gear wheel during a precision machining, accordingly includes in agreement with the prior art disclosed in the introduction, the following working steps:

a) forming a profile on the tool, which varies over the width of the tool, in which a dressing wheel is moved during a dressing procedure along the tooth flank of a tooth to be respectively dressed, in which the width of the teeth of the dressing wheel engaging with the tool to be dressed is much smaller than the width of the tool to be dressed so that, in order to cover the width of the tool to be dressed the dressing wheel has to be moved by a length in the Z direction that corresponds to a multiple of the width of the teeth of the dressing wheel, and b) precision machining of the gear wheel with the tool that has been dressed in this way.

According to the invention the dressing wheel is now moved in addition to the movement executed in the prior art in the working step a), along the respective tooth flank of the tool to be respectively dressed, with a changing pitch and a changing crossed axes angle referred to the tool to be dressed, i.e. is moved in a direction (Z direction) aligned parallel to the rotation axis of the tool axially through the respective tooth gap, in order to incorporate the respective modification of the tooth flank geometry into the tool.

The precision machining of the gear wheel then takes place in the working step b) with equalization of the helix angle of the tool changing over the width of the tool by a correction, dependent on the helix angle of the tool, of the crossed axes angle in the machining process.

The present invention is therefore also based on the concept of using, in order to dress a tool for the precision machining of gear wheels of undetermined edge, a very narrow dressing wheel compared to the width of the tool to be dressed. Correspondingly also according to the invention the shaping elements that are required for the desired modification of the flanks of the teeth of the gear wheel to be respectively precision machined by the tool are emphasised by the movements, executed during the dressing process, of the narrow dressing wheel on the tool to be dressed.

The shape of the narrow dressing wheel according to the invention must for this purpose neither agree in all parameters with the workpiece toothing, nor complicated and costly additional control possibilities must be included in the respective dressing device. Instead of this, when using a narrow dressing tool according to the invention a shape necessary for the correction of an undesired twist or for the purposeful production of such a twist can for example purposefully be introduced into the tool to be dressed, wherein during the travel over the flank of the tool to be respectively dressed the narrow dressing wheel is moved under a crossed axes angle that is changed over the width of the respective flank. In this connection the degree of the adjustment of the crossed axes angle necessary for the equalization or for producing the respective flank modification can be calculated beforehand and can then be implemented in the operational application of the method according to the invention by the machine control device and a suitable swing drive unit that swivels the tool and the dressing wheel relative to one another about a radially aligned axis (Y axis) during the dressing process. Depending on the swivel axes available on the respective machining unit, then in practice to this end the tool can be swivelled in relation to a dressing wheel stationary with respect to the swivel movement, the dressing wheel can be swivelled in relation to a tool stationary with respect to the swivel movement, or the dressing wheel and tool can simultaneously be swivelled about the Y axis.

In a manner according to the invention changes of the profile over the toothing width of the tool, such as for example twists, can be incorporated into the tool to be dressed, in order thereby to correct or purposefully incorporate the relevant modifications of the flank topology on the workpiece to be machined by the tool.

In the following precision machining of a workpiece with such a dressed hard-fine machining tool (working step b)), a modification of the crossed axes angle dependent on the helix angle of the tool takes place with equalization of the helix angle of the tool changing over the width of the tool. A twist or other flank modifications can therefore be formed on the finished precision machined workpiece without the flank modifications having to be incorporated in a complicatedly formed dressing tool.

The advantages of using a narrow dressing tool according to the invention also consist in that on account of the narrow width of the dressing tool, lower manufacturing costs are incurred. This reduces the production costs. Owing to the intensive contact between the dressing wheel and tool to be dressed that is achieved in a narrow dressing tool according to the invention, an effective removal of chips and thereby a particularly clean surface on the respectively machined gear wheels is achieved. The front cut edges of the dressing wheel can in this connection be profiled, in order to be able to carry out in a particularly simple manner corrections to the shape of the tool to be dressed via the path-controlled movement axes of the respective dressing machine.

When dressing the respective precision machining tool the relative position of the dressing wheel and tool are adjusted by means of suitable servo-drives in the direction (Z direction) aligned parallel to the rotation axis of the dressing wheel and/or in a direction (X direction) aligned transverse thereto, as well as if necessary by additional rotation about the rotation axis (B axis) of the tool to be machined and/or about the rotation axis (C axis) of the dressing wheel, in order to produce the desired flank shape (crowning, conicity) of the teeth of the tool to be dressed. In addition the dressing wheel is rotated about a radially outwardly aligned swivel axis (Y axis), so that the dressing machining of the respective tooth flank takes place with crossed axes angles changing in the width direction (Z direction) of the respective tooth and the modifications of the tooth flank topology necessary for the equalization of twists or for the specific introduction of twists into the tooth flanks of the teeth of the workpiece to be respectively precision machined are formed on the respective tooth flank.

The change of the crossed axes angle provided for according to the invention can be accomplished during the dressing machining in that an individually controlled servo-drive is provided for adjusting the relative position of the dressing wheel and tool referred to an axis (Y axis) radially aligned in relation to the tool to be dressed.

Owing to the adjustability in the X direction the pitch of the teeth of the tool to be dressed can be varied over their width. In order to be able to carry out a corresponding variation over the height of the teeth, it may be convenient to provide an individually controlled servo-drive to adjust the relative position in a direction (Y direction) aligned radially in relation to the tool to be dressed. In this way the possibilities of the flank modification can be additionally broadened.

The small width of the dressing wheel according to the invention enables at the same time the tooth flanks of the dressing wheel to be shaped independently of the contour and alignment of the tooth flanks of the tool to be dressed, so that the respective contact surface between the tool to be dressed and the dressing wheel is reduced to a minimum. Particularly in the case where a helically toothed tool is machined with a narrow dressing wheel according to the invention, the helix angle of the workpiece to be machined by the tool to be dressed is not formed, but at best only approximated, on the dressing wheel.

Also, in the dressing of helically toothed or otherwise complicatedly shaped toothed tools carried out according to the invention consequently the respective helix angle or the tooth shape to be respectively formed is determined by the movement of the dressing wheel that the latter executes in its path along the tooth flank of the tooth with which it respectively engages. The procedure according to the invention enables in this way, by means of the adjustment possibilities in the X and Z direction, the swivelling about the B and C axes as well as about the additionally provided Y pivot axis that are routinely available on conventional precision machining units, the shape to be generated on the respectively machined tooth to be predetermined by the machine control alone.

Whenever it is said here that the dressing wheel used according to the invention should be as narrow as possible, this means that its width is reduced in an optimal manner so that its tooth flanks associated with the tooth flanks of the tool to be dressed are formed in the manner of a blade edge or are at least so narrow that in each case there is only a minimal overlapping surface between the tooth flanks of the dressing wheel and the flank surfaces of the tool to be machined. Accordingly an advantageous modification of the invention envisages that the width of the teeth of the dressing wheel engaging with the tool to be dressed corresponds at most to one fifth, preferably at most one eighth, of the width of the tool to be dressed. Consequently according to the invention the tool on one workpiece front surface engages in the tooth gap bounded by the flank to be respectively modified and then moves in the Z direction along the relevant flank until it leaves from the tooth gap at the end associated with the other front surface of the workpiece.

In order on the one hand to allow the narrow dressing wheel according to the invention to move in the Z direction into the tool to be dressed, and on the other hand allow the greatest possible configuration freedom in the dressing machining of the tooth of the tool, in a practice-oriented modification of the invention the module of the dressing wheel is identical to the module of the gear wheel to be precision machined by the tool to be dressed.

The possibilities of influencing the shapes of the teeth of the tool to be dressed that are provided by the method according to the invention can then be utilised particularly effectively if the tool to be dressed is of annular shape and is internally toothed for the precision machining of externally toothed gear wheels, wherein a correspondingly externally toothed dressing wheel is used for dressing such a tool. The possibilities provided by the use of a narrow dressing wheel according to the invention allow in particular in the machining of tools for the precision machining of externally toothed gear wheels, the greatest possible degree of freedom in influencing the tooth shape to be respectively produced.

The invention thus provides a method that in a simple way enables not only the flank lines of the tool to be dressed to be modified, but also enables the tool to be dressed to be shaped so that twists and other complicated flank modifications can be achieved on the gear wheel to be precision machined with the dressed tool according to the invention.

BRIEF DESCRIPTION OF THE DRAWINGS

The invention is described in more detail hereinafter with the aid of exemplary embodiments and drawings, which respectively show diagrammatically.

DETAILED DESCRIPTION OF THE INVENTION

Figure 1:
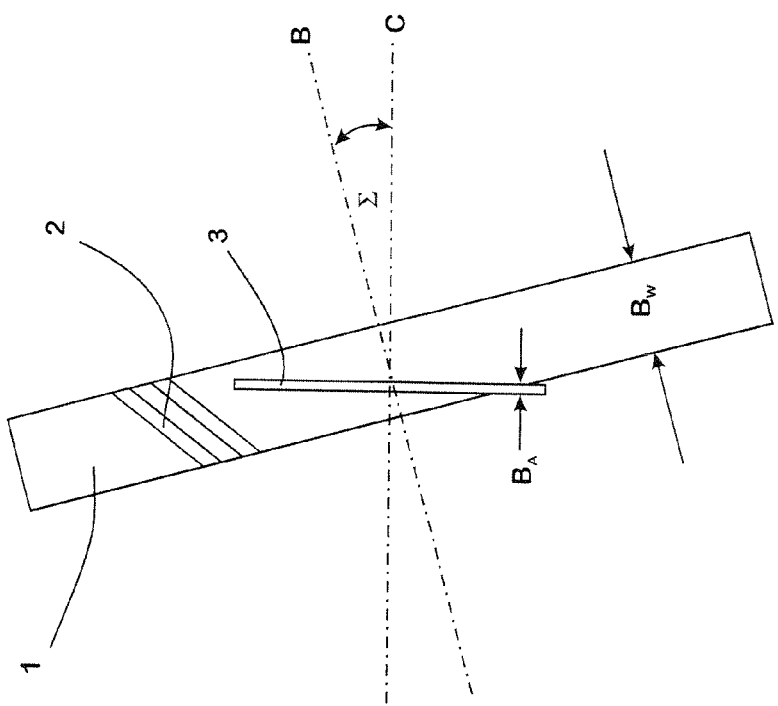
FIG. 1 a device for dressing a tool for the honing machining of an externally toothed gear wheel.
Figure 2:
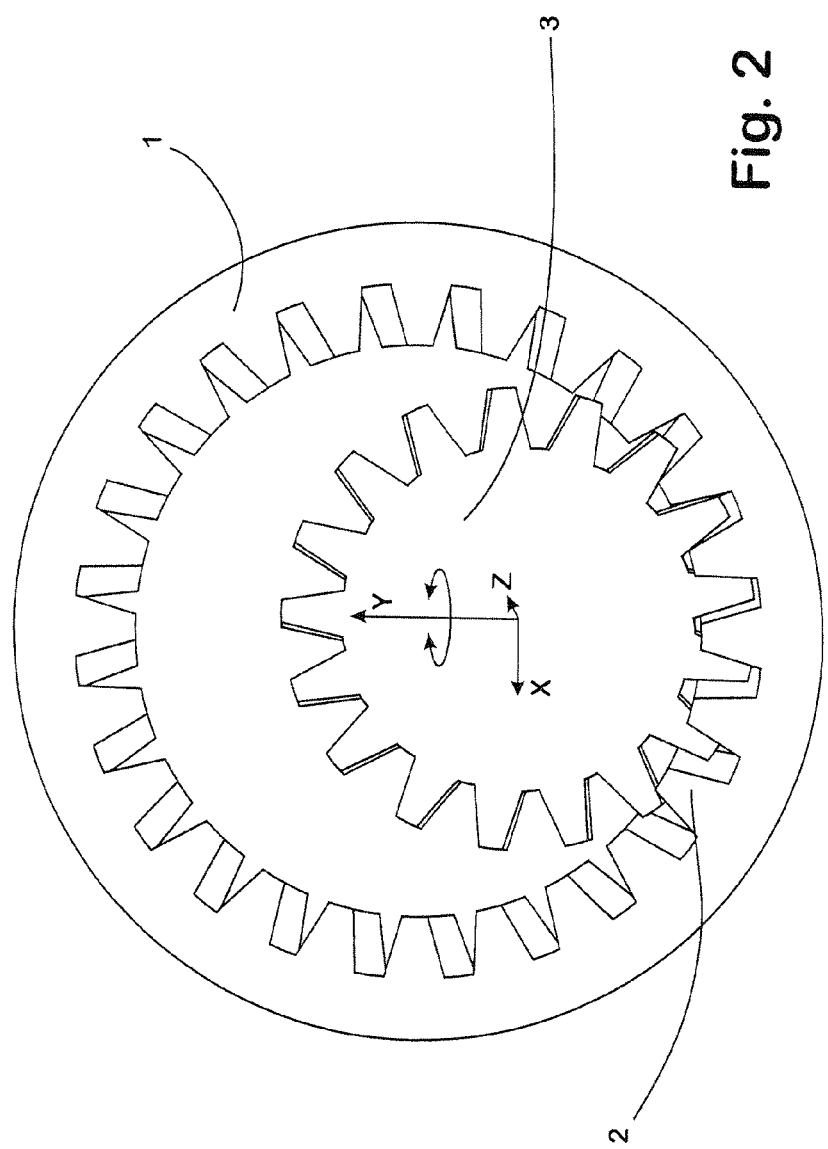
FIG. 2 the device according to FIG. 1 in a side view.
Figure 3:
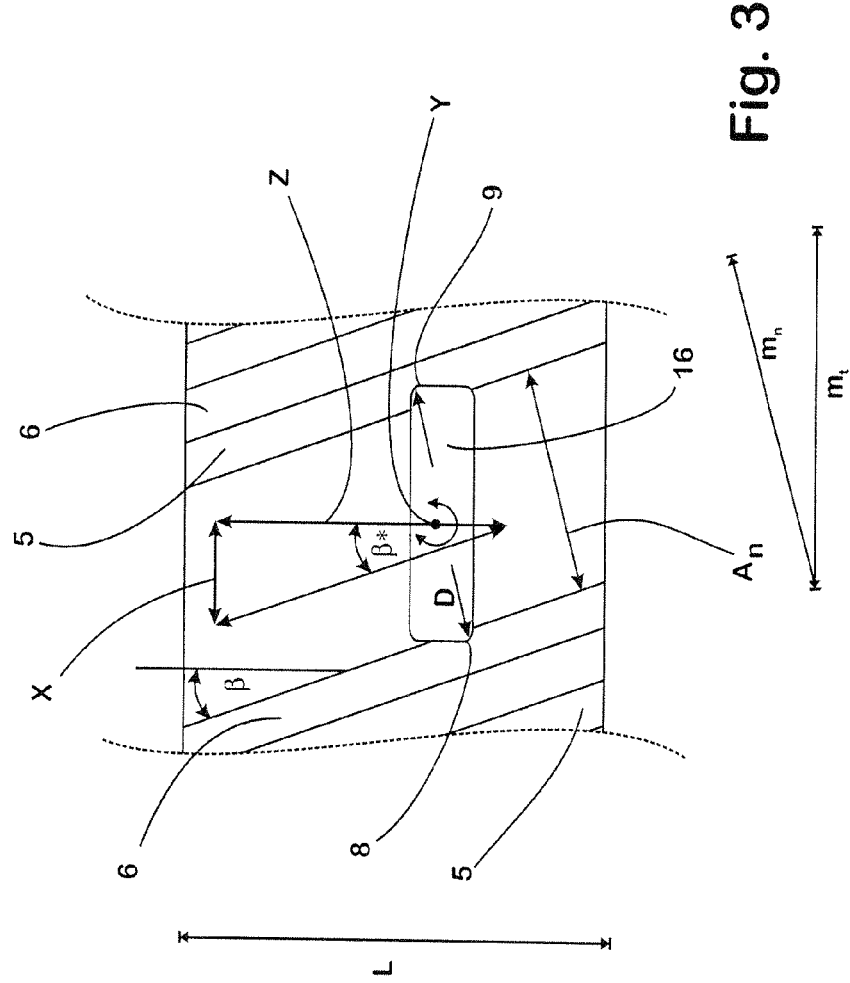
FIG. 3 a section of the dressing wheel engaging with the tool, from above.
Figure 4:
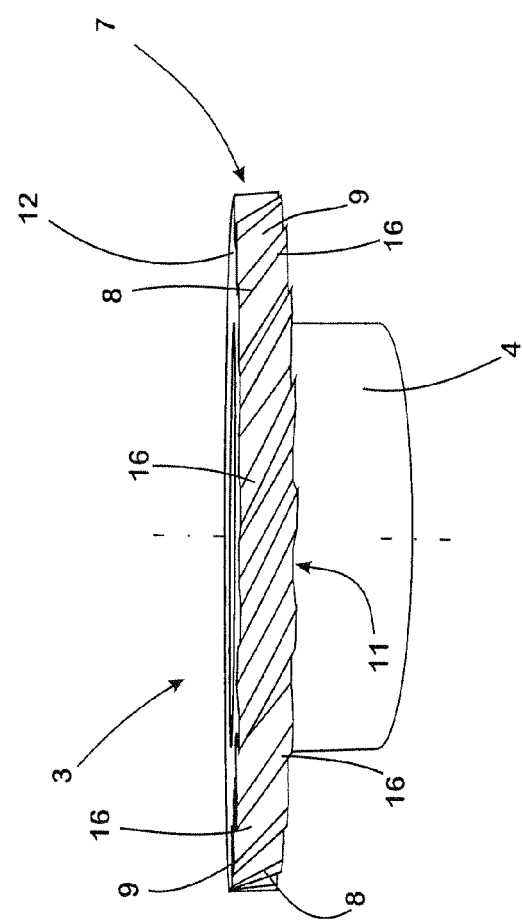
FIG. 4 a dressing wheel used in the device according to FIG. 1, in a perspective representation.
Figure 5:
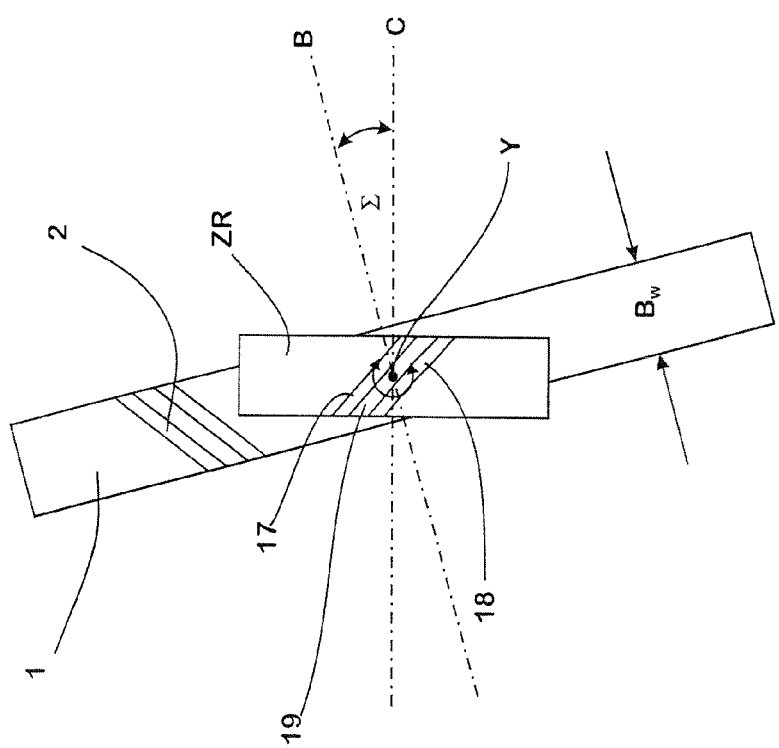
FIG. 5 the device according to FIG. 1 in the precision machining of the externally toothed gear wheel.

The tool 1 illustrated in FIG. 1 is intended for honing the toothing of an externally helical toothed gear wheel Z. For this purpose it is of annular shape and has an internal helical toothing 2.

A dressing wheel 3 is provided for dressing the tool 1.

The width $B_A$ of the dressing wheel 3 is typically less than one eighth of the width $B_W$ of the tool 1 to be dressed. Correspondingly the length L by which the dressing wheel 3 has to be moved in the direction of its rotation axis C (movement axis Z or Z direction) in order to cover the width $B_W$ of the tool 1 is more than eight times the width $B_A$ of the dressing wheel 3.

Neither the spatial allocation nor the width ratios are shown correctly to scale in the figures.

To adjust the dressing wheel in the Z direction and the X direction (movement axis X) aligned transverse thereto relative to the tool 1 to be dressed, individually controllable adjustment devices are provided (not shown here), as are normally present on conventional machines of this type. In addition the pitch of the turns completed by the tool 1 to be dressed and by the dressing wheel 3 about the B and/or C axes can be changed. This can be effected by means of the mutually independent drives that are provided for rotating the dressing wheel 3 and tool 1 to be dressed about the respectively associated rotation axis C and B.

During the dressing operation the rotation axis C of the dressing wheel 3 is at a crossed axes angle Z to the rotation axis B of the tool 1 to be dressed. In order to be able to vary the crossed axes angle Σ during the movement of the dressing wheel 3 along the tooth flank 5 to be respectively dressed, the dressing wheel 3 and the tool 1 can be swivelled relative to one another by means of a further individually controlled servo-drive about a pivot axis Y that is radially outwardly aligned in relation to the tool 1 to be dressed, on the plane defined by the Z and X movement axes.

The adjustment devices responsible for the movement in the X and Z directions as well as the drives for the rotations about the B, C and Y axes are controlled via a programmable machine control, also not shown here.

The flanks 5 of the teeth 6 of the dressed tool 1 are aligned at a helical angle β inclined to the rotation axis B of the tool 1.

The respective greatest diagonal D of the narrow teeth 16 of the dressing wheel 3, which in cross-section are formed orthogonally in their basic shape, corresponds substantially to the respective normal distance $A_n$ of the flanks 5 of the teeth 6 of the tool 1 to be dressed. In this way the tooth 16 of the dressing wheel 3 that is respectively in engagement contacts the mutually associated flanks 5 of the adjacently arranged teeth 6 of the tool 1 to be dressed, in each case only in a punctiform manner with its diagonally opposite edges 8, 9.

In order to execute this machining under the aforementioned adjustments, the gear wheel ZR to be respectively processed is placed at the position of the dressing wheel 3 in the respective device and a honing machining is performed on the gear wheel Z by means of the tool 1 dressed in the afore-described manner under the also afore-discussed adjustments and machining conditions. In this connection the flank modification previously carried out by means of the dressing wheel 3 on the honing tool 1 is transferred to the gear wheel ZR. In this way the tooth flanks 17, 18 of the teeth 19 of the gear wheel ZR after completion of the honing machining performed by the tool 1 exhibit the relevant modification, although they are not present on the dressing wheel 3 used according to the invention, but according to the invention had been produced simply by changes of the relative position on the hard-fine machining tool 1 performed about the axes X, Y, Z and B, C by means of the machine control.

In the method according to the invention for modifying the geometry of tooth flanks of a gear wheel ZR with the aid of a tool 1, which has a toothing that engages with the gear wheel ZR during the precision machining, a varied profile is thus produced over the width $B_W$ of the tool 1, in that during a dressing procedure a dressing wheel 3 is moved along the tooth flank 5 of the tooth 6 to be dressed. The width of the teeth 16 of the dressing wheel 3 is in this connection much smaller than the width $B_W$ of the tool 1. Therefore the dressing wheel 3 must be moved by a length L corresponding to a multiple of the width $B_A$ of the teeth 16 of the dressing wheel 3 in order to cover the width $B_W$ of the tool 1. After the dressing the precision machining of the gear wheel ZR is carried out with the tool 1. Since in this connection the dressing wheel 3 is moved with a changing pitch and a changing crossed axes angle Σ referred to the tool 1, the modification of the tooth flank geometry can be reproduced in the tool 1. In the subsequent precision machining a modification of the crossed axes angle Σ dependent on the helical angle of the tool 1 takes place in the machining process with equalization of the changing helix angle of the tool 1 over the width of the teeth 16 of the tool.

REFERENCE NUMERALS

1 Annular tool for honing the toothing of an externally helically toothed gear wheel
2 Internal helical toothing of the tool 1
3 Dressing wheel
4 Carrier of the dressing wheel 3
5 Tooth flanks of the teeth 6
6 Teeth of the tool 1 to be dressed
7 Tooth flanks of the dressing wheel 3
8, 9 Edges in the region of the transition between the tooth flanks 7 and the front surfaces 11, 12 of the dressing wheel 3
11, 12 Front surfaces of the dressing wheel 3
13, 14 Curved sections
15 Surface section
16 Teeth of the dressing wheel 3
$A_n$ Normal distance of the flanks 5
β Helical angle
B Rotation axis of the tool 1
β* Angle
$B_A$ Width of the dressing wheel 3
$B_W$ Width of the tool 1 to be dressed C Rotation axis of the dressing wheel 3
Diagonal
L Length by which the dressing wheel 3 has to be moved in the direction of its rotation axis C (Z direction) in order to cover the width $B_W$ of the tool 1
$m_n$ Normal module
$m_t$ Transverse module of the tool 1 to be dressed
$\Sigma$ Crossed axes angle
Y, X, Z Movement axes
ZR Gear wheel

The invention claimed is:

1. A method for modifying a geometry of tooth flanks of a gear wheel with the aid of a tool, which has a toothing engaging with the teeth of the gear wheel during a precision machining, wherein the following working steps are performed:
   a) forming a profile on the tool varying over a width of the tool, in which a dressing wheel is moved during a dressing procedure along the tooth flank of the tooth to be respectively dressed, wherein the width of the teeth of the dressing wheel engaging with the tool to be dressed is smaller than the width of the tool to be dressed to such an extent that, in order to cover the width of the tool to be dressed, the dressing wheel has to be moved by a length in a direction that corresponds to a multiple of the width of the teeth of the dressing wheel, and
   b) precision machining of the gear wheel with the tool that has been dressed in this way,
   wherein the dressing wheel during the working step a) is moved with a changing pitch and a changing crossed axes angle in relation to the tool to be dressed, in order to incorporate the respective modification of the tooth flank geometry into the tool, and wherein the precision machining of the tooth in the working step b) takes place in the machining process by a modification of the crossed axes angle dependent on the helical angle of the tool with equalization of the changing helical angle of the tool over the width of the teeth of the tool.

2. The method according to claim 1, wherein during the dressing the narrow dressing wheel and the tool to be dressed are rotatably driven respectively about a rotation axis via respectively their own individually controllable drive.

3. The method according to claim 2, wherein individually controllable servo-drives are provided for adjusting the relative position of the tool to be dressed and the dressing wheel in the direction of the rotation axis of the dressing wheel as well as a direction aligned transverse thereto.

4. The method according to claim 1, wherein an individually controllable servo-drive for swivelling the dressing wheel or the tool to be dressed can be swivelled about an axis radially aligned in relation to the tool to be dressed.

5. The method according to claim 1, wherein an individually controllable servo-drive is provided for adjusting the relative position in a direction radially aligned in relation to the tool to be dressed.

6. The method according to claim 1, wherein the width of the teeth of the dressing wheel engaging with the tool to be dressed corresponds at most to a fifth of the width of the tool to be dressed.

7. The method according to claim 6, wherein the width of the teeth of the dressing wheel engaging with the tool to be dressed corresponds at most to an eighth of the width of the tool to be dressed.

8. The method according to claim 1, wherein in the dressing the tooth of the dressing wheel respectively engaging with the tool to be dressed contacts in a punctiform manner the tool to be dressed in at least one of its edge regions.

9. The method according to claim 1, wherein in the dressing the tooth of the dressing wheel respectively engaging with the tool to be dressed contacts in a linear manner the tool to be dressed in at least one of its edge regions.

10. The method according to claim 7, wherein in the dressing the tooth of the dressing wheel respectively engaging with the tool to be dressed contacts in a linear manner the tool to be dressed in at least one of its edge regions.

\* \* \* \* \*